United States Patent
Bergset et al.

(10) Patent No.: US 10,190,820 B2
(45) Date of Patent: Jan. 29, 2019

(54) METHOD FOR DRYING WET PARTICULATE MATTER, WHEREIN THE DRIED PARTICULATE MATTER IS A WHITE MINERAL HAVING A BRIGHTNESS RY OF AT LEAST 65% THAT FORMS PARTICULATE MATTER THROUGH DRYING IN DIRECT SUPERHEATED STEAM DRYER

(75) Inventors: Olav Bergset, Birmingham, AL (US); Alain Cremaschi, Saint Germain la Ville (FR); Robert Gutsche, Dornach (CH); Ludovic Hautcoeur, Courtisols (FR)

(73) Assignee: Omya International AG, Oftringen (CH)

( * ) Notice: Subject to any disclaimer, the term of this patent is extended or adjusted under 35 U.S.C. 154(b) by 946 days.

(21) Appl. No.: 14/008,679

(22) PCT Filed: Apr. 11, 2012

(86) PCT No.: PCT/EP2012/056494
§ 371 (c)(1),
(2), (4) Date: Dec. 12, 2013

(87) PCT Pub. No.: WO2012/140028
PCT Pub. Date: Oct. 18, 2012

(65) Prior Publication Data
US 2014/0310979 A1 Oct. 23, 2014

Related U.S. Application Data

(60) Provisional application No. 61/517,609, filed on Apr. 22, 2011.

(30) Foreign Application Priority Data

Apr. 15, 2011 (EP) ...................................... 11162729

(51) Int. Cl.
*F26B 3/00* (2006.01)
*F26B 3/02* (2006.01)
(Continued)

(52) U.S. Cl.
CPC .............. *F26B 3/02* (2013.01); *C01F 11/185* (2013.01); *F26B 11/16* (2013.01); *F26B 17/20* (2013.01);
(Continued)

(58) Field of Classification Search
CPC ........ F26B 11/16; F26B 17/20; F26B 23/004; F26B 3/02; F26B 2200/18; C01F 11/185; Y02P 70/405; Y02B 30/52
(Continued)

(56) References Cited

U.S. PATENT DOCUMENTS 2,622,342 A 12/1952 Goulounes et al.
4,223,452 A 9/1980 Chambers
(Continued)

FOREIGN PATENT DOCUMENTS

EP 0058651 A1 8/1982
EP 1790616 A1 * 5/2007 ............ C01F 11/185
(Continued)

OTHER PUBLICATIONS

International Search Report dated May 16, 2012 for PCT Application No. PCT/EP2012/056494.
(Continued)

*Primary Examiner* — Kenneth Rinehart
*Assistant Examiner* — Bao D Nguyen
(74) *Attorney, Agent, or Firm* — Amster, Rothstein & Ebenstein LLP

(57) ABSTRACT

The present invention relates to a method for drying wet particulate matter, wherein at least one feed stream (1) of wet particulate matter is contacted with superheated steam (6) within at least one drying chamber (40) with a mixing system, and the dried particulate matter is discharged as at least one product stream (10) to obtain the dried particulate matter.

44 Claims, 4 Drawing Sheets

(51) Int. Cl.
*F26B 11/16* (2006.01)
*F26B 17/20* (2006.01)
*F26B 23/00* (2006.01)
*C01F 11/18* (2006.01)

(52) U.S. Cl.
CPC ........ *F26B 23/004* (2013.01); *F26B 2200/18* (2013.01); *Y02B 30/52* (2013.01); *Y02P 70/405* (2015.11)

(58) Field of Classification Search
USPC .......................................................... 34/487
See application file for complete search history.

(56) References Cited

U.S. PATENT DOCUMENTS

| | | | |
|---|---|---|---|
| 4,242,808 A * | 1/1981 | Luthi | D21F 5/00 162/207 |
| 4,523,388 A * | 6/1985 | Cuel | A23L 3/40 34/169 |
| 4,760,650 A | 8/1988 | Theliander et al. | |
| 4,765,399 A | 8/1988 | Haacker et al. | |
| 4,974,335 A | 12/1990 | Bege et al. | |
| 5,291,668 A | 3/1994 | Becker et al. | |
| 5,291,688 A * | 3/1994 | Pederson | E06B 3/92 49/501 |
| 5,632,102 A * | 5/1997 | Luy | B01J 2/16 34/372 |
| 2002/0064085 A1 * | 5/2002 | Takahashi | A61L 9/16 366/144 |
| 2005/0158226 A1 * | 7/2005 | Misske | C01F 11/183 423/432 |
| 2007/0113422 A1 | 5/2007 | Jochem et al. | |
| 2011/0197781 A1 * | 8/2011 | Schwarzentruber | A01N 35/02 106/15.05 |

FOREIGN PATENT DOCUMENTS

| | | | |
|---|---|---|---|
| JP | 2010174057 A | 8/2010 | |
| WO | 03052336 A1 | 6/2003 | |
| WO | WO 03052336 A1 * | 6/2003 | ............... F26B 3/06 |
| WO | 2004103927 A2 | 12/2004 | |

OTHER PUBLICATIONS

Written Opinion of the International Searching Authority dated May 16, 2012 for PCT Application No. PCT/EP2012/056494.
Oates "Lime and Limestone: Chemistry and Technology, Production and Uses." Wiley-VCH, Weinheim, XP002658329, May 14, 1998, pp. 15-16, 109, 352-354.
Kröll et al. "Trocknen and Trockner in der Produktion." Springer-Verlag, XP002658330, Sep. 6, 1989, pp. 504-505.
Chemietechnik et al. "Cheffiziente Trocknung," vol. 22 No. 3, XP000359541, Mar. 1, 1993, p. 70.
English Translation of Office Action dated Sep. 30, 2014 for Japanese Patent Application No. 2014-504286.

* cited by examiner

METHOD FOR DRYING WET PARTICULATE MATTER, WHEREIN THE DRIED PARTICULATE MATTER IS A WHITE MINERAL HAVING A BRIGHTNESS RY OF AT LEAST 65% THAT FORMS PARTICULATE MATTER THROUGH DRYING IN DIRECT SUPERHEATED STEAM DRYER

CROSS-REFERENCE TO RELATED APPLICATIONS

This application is a U.S. national phase of PCT Application No. PCT/EP2012/056494, filed Apr. 11, 2012, which claims priority to European Application No. 11162729.5, filed Apr. 15, 2011 and U.S. Provisional Application No. 61/517,609, filed Apr. 22, 2011.

The present invention relates to the field of drying processes, and more specifically to a method for drying wet particulate matter using superheated steam.

Superheated steam drying is an emerging technology, which utilizes superheated steam as drying medium in direct contact with the wet product to be dried. Compared to direct air or inert gas dryers, direct superheated steam dryers have a number of well known basic advantages such as lower energy consumption due to no air or inert gas heating, the excess steam is more suitable for heat recovery as it is not mixed with air or inert gas, negligible emission of polluted air or inert gas, no explosion risk inside equipment, or low oxidation of products that would normally oxidize by air.

Saturated steam is often used as the energy source in indirect drying processes, which are based on a drying principle giving potentially the same basic advantages as a direct superheated steam dryer. However, the indirect drying principle differs significantly from the direct drying principle as heat is not supplied via direct contact between wet product and drying medium. Rather, heat is supplied via hot surface in contact with the product to be dried. Furthermore, indirect dryers require specially designed heat exchangers for use inside the drying chamber, which are complex and costly compared to standard heat exchangers.

The Netherlands Organization for Applied Scientific Research (TNO) published in June 2004 a report (R 2004/239), entitled "Industrial superheated steam drying", which mentions that so far over hundred drying installations are found which utilize the superheated steam drying technology, mostly large scale continuous dryers for bulk materials. However, the superheated steam dryers known in the art still suffer from the problem that due to their construction a lot of the employed energy cannot be recovered. This is particularly the case when a superheated steam dryer is not connected to other external processes or heat sinks but is used as standalone system.

WO 03/052336 describes a mixing dryer based on the principle of direct superheated steam drying, with a cyclone, i.e. a fines/steam separator, in the drying chamber outlet steam and with a traditional energy system. The need of a cyclone in the recirculation circuit causes an increased pressure drop that needs to be compensated by higher differential pressure of the circulation fan, and hence, results in significantly increased energy consumption of the circulation fan. Furthermore, the use of a traditional energy system means that energy recovery is only possible by connecting this mixing dryer to other external processes or heat sinks.

U.S. Pat. No. 5,291,668 discloses an atmospheric superheated steam drying process using a flash type dryer, wherein the dry product is separated from the steam through the use of a curvilinear louver separator. The water steam separated from the dry product is recovered and recirculated as steam energy through the use of a mechanical vapour compressor, while the drying medium or carrier gas or superheated steam is either heated in external heat exchangers or in heat exchangers internally of the drying chamber or a combination of these methods. One basic limitation of this process, however, is that the drying medium or carrier gas flow rate influences the overall functionality of the drying process, and thus, makes it infeasible to run the described drying system at an optimal energy recovery system temperature level without either increasing the dryer size significantly compared to conventional sizing or introducing complex heat exchanger surfaces inside the drying chamber. Furthermore, a fines and product separator is mandatory in said flash dryer which leads to an additional pressure drop that needs to be compensated by spending more energy for the circulation fan.

EP 0058651 relates to a cattle feed flash-/pneumatic dryer, wherein the product particles are simultaneously transported in pipeline and dried in the carrier gas or drying medium or superheated steam, wherein the drying medium is re-heated through the double wall pipeline. This drying system has also the limitation that the drying medium or carrier gas flow rate influences the overall functionality of the drying process, and thus, makes it infeasible to run the described drying system at an optimal energy recovery system temperature level without increasing the dryer size significantly compared to conventional sizing. This system also requires a cyclone or other type of separator, which is unfavourable in terms of energy consumption.

U.S. Pat. No. 4,242,808 describes a direct superheated steam drying process specifically for paper web in a paper mill. The energy can be recovered at least partly by use of a mechanical vapour compressor. However, this system requires a high inlet temperature and also is not suitable for drying particulate matter.

For completeness, the Applicant would like to mention the following US patents, which refer to indirect drying principles with energy recovery by means of mechanical vapour recompression: U.S. Pat. No. 4,523,388, U.S. Pat. No. 4,223,452, U.S. Pat. No. 2,622,342, and U.S. Pat. No. 4,974,335.

There remains a need in the art for a more energy-efficient drying method for wet particulate matter.

Accordingly, it is an object of the present invention to provide a drying method for wet particulate matter, which requires less energy consumption. It would also be desirable to provide an energy-efficient drying system that is not dependant of being connected to other external thermal processes or heat sinks. It is also desirable that such a system can be utilized under industrial conditions.

It is also an object of the present invention to provide a drying method for wet particulate matter that utilizes a less complex steam recirculation circuit which accepts a certain amount of carried particulate matter. It would also be desirable to provide a drying method that allows integrated recycling of carried particulate matter in the excess steam with low or negligible energy consumption.

The foregoing and other objects are solved by the provision of a method for drying wet particulate matter, wherein the dried particulate matter is a white mineral having a brightness Ry of at least 65% measured according to DIN 53163, the method comprising the steps of:

a) providing at least one feed stream (1) of wet particulate matter,
b) providing a recirculation circuit comprising at least one drying chamber (40), at least one circulation fan (41), and at least one heat exchanger (42), wherein the at least one drying chamber (40) comprises a mixing system and mixed particulate matter, at least one inlet for the at least one feed stream of wet particulate matter, at least one inlet for superheated steam, and at least one outlet for exhaust steam,
c) feeding, either continuously or discontinuously, the at least one feed stream (1) of wet particulate matter into the mixed particulate matter in the at least one drying chamber (40) via the at least one inlet for the feed stream,
d) feeding superheated steam (6) into the at least one drying chamber (40) via the at least one inlet for superheated steam,
e) directly contacting the mixed particulate matter with superheated steam within the at least one drying chamber (40) to dry the mixed particulate matter and exhausting said steam via the at least one outlet for exhaust steam (3) without separating from the exhaust steam (3) any carried particulate matter,
f) feeding the exhaust steam (3, 4, 5) into the at least one heat exchanger (42), in which the exhaust steam is reheated to provide superheated steam (6), wherein the exhaust steam passes the at least one circulation fan (41) before or after the at least one heat exchanger (42), and feeding said superheated steam back into the at least one drying chamber (40) via the at least one inlet for superheated steam,
g) splitting an excess steam (7) from at least one position within the recirculation circuit,
h) feeding the excess steam (7) into at least one mechanical compressor (43), wherein the excess steam is compressed to raise the saturated temperature of the excess steam, using said compressed excess steam (8) as a source of heat in the at least one heat exchanger (42), and discharging the excess steam as a liquid condensate (9), and
i) discharging, either continuously or discontinuously, the dried particulate as at least one product stream via at least one outlet to obtain the dried particulate matter.

According to another aspect of the present invention, the drying method according to the present invention is used for manufacturing calcium carbonate having a solid content of more than 95 wt.-%, wherein the calcium carbonate is preferably manufactured without the presence of a classifier.

According to another aspect of the present invention, a white mineral obtainable by a method according to the present invention is provided, wherein the white mineral has a brightness Ry of at least 65% measured according to DIN 53163.

Advantageous embodiments of the present invention are defined in the corresponding sub-claims.

According to one embodiment the at least one drying chamber (40) comprises at least one outlet for dried particulate matter and the at least one product stream is discharged via the at least one outlet for dried particulate matter from the at least one drying chamber and/or the remaining recirculation circuit excluding the at least one drying chamber comprises at least one outlet for dried particulate matter and the at least one product stream is discharged via the at least one outlet for dried particulate matter from the recirculation circuit excluding the at least one drying chamber.

According to one embodiment the mixing system within the drying chamber is selected from a one, two- or more shafts mixer, or a one, two- or more shafts combined mixer and mechanical fluidized bed establisher, preferably the mixing system is a two shafts combined mixer and mechanical fluidized bed establisher.

According to one embodiment the pressure in the at least one drying chamber is from 0 to 5 bar, preferably from 0.1 to 1.5 bar, and more preferably from 0.1 to 0.95 bar or from 1.05 to 1.2 bar. According to another embodiment the superheated steam is superheated water steam and the pressure drop through the recirculation circuit is from 500 to 3000 Pa, preferably from 1000 to 2000 Pa, at a pressure in the at least one drying chamber of 0.8 to 1.2 bar.

According to one embodiment the excess steam (7) is split from at least one position within the recirculation circuit, wherein the amount of carried particulate matter is found to be lowest, preferably the excess steam (7) is split from the exhaust steam (3) after leaving the at least one drying chamber (40) and before leaving the at least one circulation fan (41).

According to one embodiment the at least one heat exchanger (42) is a shell and tube heat exchanger. According to another embodiment the at least one mechanical compressor is a centrifugal compressor, a high pressure centrifugal fan, or a positive displacement roots blower, preferably a high pressure centrifugal fan.

According to one embodiment the temperature of the superheated steam (6) and the temperature of the exhaust steam (3) leaving the at least one drying chamber differs by a temperature difference $\Delta T_R$, wherein $\Delta T_R$ is from 5 to 100° C., preferably from 10 to 50° C., more preferably from 15 to 30° C., even more preferably from 15 to 25° C., and most preferably about 22° C. According to another embodiment the saturated temperature of the excess steam (7) and the saturated temperature of the compressed excess steam (8) differs by a temperature difference $\Delta T_E$, wherein $\Delta T_E$ is from 6 to 130° C., preferably from 11 to 80° C., more preferably from 15 to 60° C., and most preferably from 20 to 45° C. According to still another embodiment the difference between $\Delta T_E$ and $\Delta T_R$ is from 1 to 30° C., preferably from 4 to 20° C., more preferably from 6 to 15° C., and most preferably from 6 to 10° C.

According to one embodiment the excess steam (7) passes at least one separator (44) to remove any carried particulate matter from the excess steam before it is fed as purified or reboiled excess steam (17) into at least one mechanical compressor (43). According to another embodiment the removed carried particulate matter is fed as a recycle stream (13) into the at least one drying chamber (40) or into the at least one feed stream (1, 2). According to still another embodiment the at least one feed stream (1) is preheated before it is fed into the at least one drying chamber (40), preferably the feed stream (1) is preheated by at least one heat exchanger (46), wherein the liquid condensate (9, 19) and/or the discharge stream from the at least separator (44) is used as a source of heat.

According to one embodiment the obtained dried particulate matter contains less than 15 wt.-% total moisture, preferably less than 5 wt.-%, more preferably less than 2 wt.-%, and most preferably less than 1 wt.-%, based on the total weight of the dried particulate matter. According to another embodiment the average retention time of the dried particulate matter inside the recirculation circuit is at least 10 minutes, at least 30 minutes, or at least 60 minutes.

According to one embodiment the white mineral is selected from a calcium carbonate-based mineral or calcium hydroxide or calcium sulphate, preferably calcium carbonate, more preferably ground calcium carbonate, modified calcium carbonate, or precipitated calcium carbonate, or selected from calcium carbonate-containing minerals wherein calcium carbonate-containing minerals preferably comprise dolomite or tailings from calcium carbonate flotation, or mixtures thereof. According to another embodiment the white mineral is a calcium carbonate-based mineral mixed with clay or talc or calcium hydroxide or calcium sulphate, or is calcium carbonate-kaolin mixtures or mixtures of calcium carbonate and bentonite, or mixtures of natural calcium carbonate with aluminium hydroxide, magnesium hydroxide, mica or with synthetic or natural fibers or is co-structures of minerals, preferably talc-calcium carbonate or talc-titanium dioxide or calcium carbonate-titanium dioxide co-structures.

According to one embodiment the obtained dried particulate matter is calcium carbonate having a solid content of more than 95 wt.-%, based on the total weight of the calcium carbonate. According to another embodiment the white mineral obtainable by a method according to the present invention is calcium carbonate having a total moisture of less than 5 wt.-%, based on the total weight of the calcium carbonate.

According to still another embodiment the white mineral obtainable by a method according to the present invention is used in paper applications, paints, sealants, adhesives, concrete, agriculture, cosmetics, food, feed, pharmaceuticals, water treatment and/or in plastics.

Figure 1:
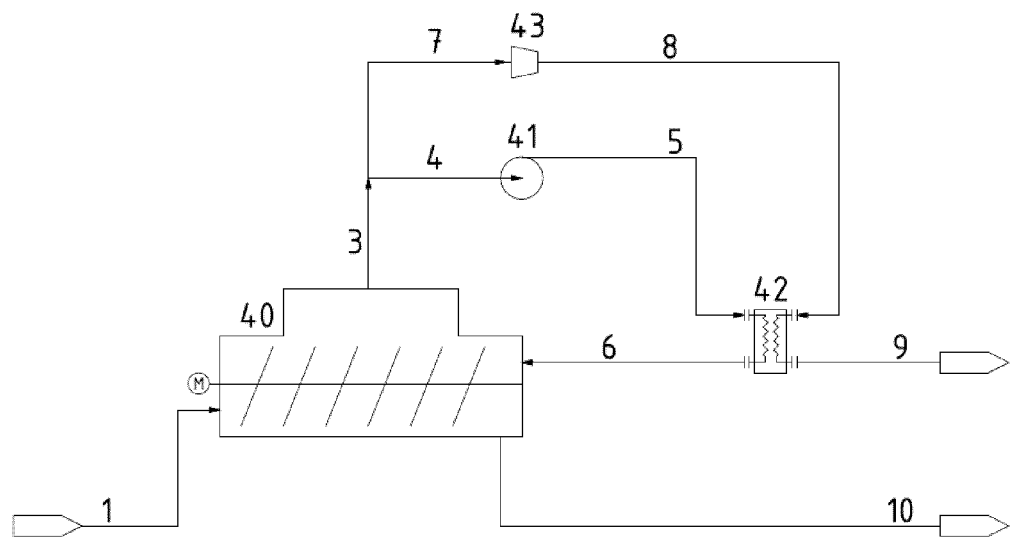
FIG. 1 is a schematic flow diagram illustrating an exemplary embodiment of the present invention.

For the purpose of the present invention, the term "wet particulate matter", "feed" or "feed stream" refers to a fresh feed or stream, which is fed into the at least one drying chamber employed in the method according to the present invention, and is a homogeneous or heterogeneous mixture of at least one solid substance with a liquid, e.g., in form of a solution, suspension or dispersion, which forms a particulate product through drying. The wet particulate matter may be present, for example, as liquid, slurry, paste, agglomerates, granulates, crystals, pellets, moist particles, moist pieces or moist cake. The liquid may comprise water, organic solvents, or any other liquid substance, or mixtures thereof. The solids content of the wet particulate matter may be at least 5 wt.-%, preferably at least 25 wt.-%, based on the total weight of the wet particulate matter.

For the purpose of the present invention, "dried particulate matter" or "product" is understood to refer to particulate matter having a total moisture content of less than 15 wt.-%, less than 5 wt.-%, less than 2 wt.-%, preferably less than 1 wt.-%, based on the total weight of the dried particulate matter.

The term "mixed particulate matter" as used in the context of the present invention refers to the particulate matter that is inside the drying chamber, which is simultaneously dried by the drying medium and mixed with or wetted by the wet particulate matter. The total moisture content of the mixed particulate matter is between the moisture content of the wet particulate matter and the dried particulate matter.

The term "carried particulate matter" or "fines" as used in the context of the present invention refers to the particulate matter, either partly dried- or dried particulate matter, that is carried along with the exhaust steam from the drying chamber. The total moisture content of the carried particulate matter could change when it travels through the recirculation circuit or when it is carried along with the excess steam.

The term "retention time" as used in the context of the present invention refers to the average retention time of dried particulate matter inside the drying system, and is calculated by dividing the dried particulate matter inside drying system at steady state conditions by the dried particulate matter flow rate in the at least one product stream.

A "mineral" in the meaning of the present invention encompasses a solid inorganic substance having a characteristic chemical composition. A "white" mineral in the meaning of the present invention is a white mineral having a brightness Ry of at least 65% measured according to DIN 53163 (issue date: July 1988).

"Ground calcium carbonate" (GCC) in the meaning of the present invention is a calcium carbonate obtained from natural sources, such as limestone, calcite, marble or chalk or dolomite, and processed through a treatment such as grinding, screening and/or fractionizing by wet and/or dry, for example by a cyclone or classifier.

"Precipitated calcium carbonate" (PCC) in the meaning of the present invention is a synthesized material, generally obtained by precipitation following the reaction of carbon dioxide and lime in an aqueous environment or by precipitation of a calcium and carbonate source in water or by precipitation of calcium and carbonate ions, for example $CaCl_2$ and $Na_2CO_3$, out of solution.

A "drying medium" in the meaning of the present invention, is a solvent that is used to dry and remove the liquid component from the mixed particulate matter. The drying medium composition may be similar or rather similar to the liquid component of the wet particulate matter.

The term "exhaust steam" as used in the context of the present invention refers to superheated steam enriched with moisture and/or volatile components evaporated from the mixed particulate matter during the direct drying process within the at least one drying chamber. Furthermore, the exhaust steam may comprise carried particulate matter that is carried along with the exhaust steam.

For the purpose of the present invention, the phrase "without separating from the exhaust steam any carried particulate matter" means that no fines/steam separating device generating a significant additional pressure drop in the recirculation circuit, such as a cyclone or filter or similar, is used to separate the carried particulate matter from the steam travelling along the recirculation circuit.

For the purpose of the present invention, the term "saturated temperature" refers to the temperature at which the physical state of a drying medium changes from liquid to vaporous, wherein the saturated temperature of the drying medium depends on its pressure.

For the purpose of the present invention, the term "boiling point elevation" refers to the difference between the boiling point of a certain amount of solid substance mixed and/or dissolved with a solvent at a certain pressure, and the saturated temperature of the pure solvent at the same pressure.

The term "solvent" as used in the context of the present invention refers to both solvents that dissolve solid substances and also any other type of liquids not dissolving, however, carrying solids, e.g., in form of a dispersion or suspension.

A "slurry" in the meaning of the present invention comprises insoluble solids and liquid and optionally further additives and dissolved solids and usually contains large amounts of insoluble solids and, thus, is more viscous and generally of higher density than the liquid from which it is formed.

The term "superheated steam" or "steam" as used in the context of the present invention refers to a steam or vapour of a drying medium. The prefix "superheated" refers to a temperature higher than the saturated temperature of the respective drying medium. The term "steam" or "vapour", without prefix superheated, as used in the context of the present invention refers either to a steam at saturated temperature or at a temperature slightly higher than the saturated temperature of the respective solvent. Any kind of superheated solvent steam or mixture of superheated solvent steams may be used in the method of the present invention, for example, but not limited to water, methanol, ethanol, isopropanol, butanol, other alcohols, propylene glycol, mono ethylene glycol, ethylene glycol, other glycols, hydrocarbons, or mixture of at least two of these solvents.

The term "total moisture content" as used in the context of the present invention refers to the amount of solvent absorbed on the surface of the particulate matter and within the particulate matter, which can be evaporated from the particulate matter. In case the solvent is water, the wt.-% water of the particulate matter is determined according to suitable measuring methods for the specific solid substance, for instance the Coulometric Karl Fischer measurement method, wherein the mineral powder and/or the composite particles or particulate matter are heated to 220° C., or a different temperature suitable for the specific solid substance, and the water content is released as vapour or steam and isolated using a stream of nitrogen gas (at 100 ml/min) is determined in a Coulometric Karl Fischer unit.

The term "total energy consumption" as used in the context of the present invention refers to the total electrical energy consumption plus the total thermal energy consumption and is specified in kWh.

The term "total electrical energy consumption" as used in the context of the present invention refers to the electrical energy consumption of all the equipment within the actual process consuming electrical energy and is specified in kWh.

The term "total thermal energy consumption" as used in the context of the present invention refers to the thermal or heat energy consumption required for the actual process to be performing as specified and is specified in kWh.

The term "mechanical fluidized bed establisher" as used in the context of the present invention refers to a fluidized bed of particles, however, not established by means of a fluid passing through a particle bed but instead by means of mechanical forces via the mixing device, while the result is similar as liquefaction by means of a fluid (liquid or steam or gas) that is passed up through the particulate matter, whereby the particulate matter is converted from a static solid-like state to a dynamic fluid-like state. When fluidized, a bed of solid particles will behave as a fluid, like a liquid or steam or gas.

For the purpose of the present invention, the term "bar" refers to the absolute pressure, i.e. 1.01325 bar equals atmospheric pressure, i.e. one standard atmosphere (1 atm).

In the following, the features of the inventive process will be described with the help of FIG. 1 illustrating one embodiment of the drying method of the present invention.

The inventive process for drying wet particulate matter comprises the step of providing at least one feed stream (1) of wet particulate matter.

The wet particulate matter to be dried in the inventive process can be derived from various sources and is a white mineral having a brightness Ry of at least 65% measured according to DIN 53163 (issue date: July 1988) after it has been dried by the inventive method.

According to one embodiment of the present invention, the white mineral is selected from a calcium carbonate-based mineral or calcium hydroxide or calcium sulphate, preferably calcium carbonate, more preferably ground calcium carbonate (GCC), modified calcium carbonate, or precipitated calcium carbonate (PCC), or selected from calcium carbonate-containing minerals wherein calcium carbonate-containing minerals preferably comprise dolomite or tailings from calcium carbonate flotation, or mixtures thereof.

A natural ground calcium carbonate (GCC) may feature, e.g., one or more of marble, limestone, chalk, calcite and/or dolomite. A precipitated calcium carbonate (PCC) may feature, e.g., one or more of aragonitic, vateritic and/or calcitic mineralogical crystal forms. Aragonite is commonly in the acicular form, whereas vaterite belongs to the hexagonal crystal system. Calcite can form scalenohedral, prismatic, spheral, and rhombohedral forms. A modified calcium carbonate may feature a natural ground or precipitated calcium carbonate with a surface and/or internal structure modification, e.g., the calcium carbonate may be treated or coated with a hydrophobising surface treatment agent such as, e.g. an aliphatic carboxylic acid or a siloxane, or may be reacted with an acid and carbon dioxide. Calcium carbonate may be treated or coated to become cationic or anionic with, for example, a polyacrylate or polydadmac.

Preferably the mineral pigment is ground calcium carbonate, modified calcium carbonate or a precipitated calcium carbonate, or a mixture thereof.

According to another embodiment of the present invention, the white mineral is a calcium carbonate-based mineral mixed with clay or talc or with calcium hydroxide or calcium sulphate, or is calcium carbonate-kaolin mixtures or mixtures of calcium carbonate and bentonite, or mixtures of natural calcium carbonate with aluminium hydroxide, magnesium hydroxide, mica or with synthetic or natural fibers or is co-structures of minerals, preferably talc-calcium carbonate or talc-titanium dioxide or calcium carbonate-titanium dioxide co-structures.

According to one embodiment of the present invention, the wet particulate matter is in form of a liquid, a slurry, a paste, agglomerates, granulates, crystals, pellets, moist particles, moist pieces or a moist cake. Preferably, the wet particulate matter is in form of a slurry.

The liquid component of the wet particulate matter may be water, an organic solvent or any other liquid, or mixtures thereof. Examples for suitable organic solvents are methanol, ethanol, isopropanol, butanol, other alcohols, propylene glycol, mono ethylene glycol, ethylene glycol, other glycols, hydrocarbons, or mixture of at least two of these solvents.

Preferably, the liquid component of the wet particulate matter is mainly water, more preferably water.

The solids content of the wet particulate matter may be in the range from 5 to 95 wt.-%, based on the total weight of the wet particulate matter. According to one embodiment of the present invention, the solids content of the wet particulate matter is at least 5 wt.-%, at least 15 wt.-%, preferably at least 25 wt.-%, more preferably at least 35 wt.-%, and most preferably at least 50 wt.-%, based on the total weight of the wet particulate matter. For example, the solids content of the wet particulate matter is from 5 to 95 wt.-%, from 15 to 95 wt.-%, from 25 to 95 wt.-%, from 35 to 95 wt.-%, or from 50 to 95 wt.-%, based on the total weight of the wet particulate matter.

The inventive method for drying wet particulate matter comprises further the step of providing a recirculation circuit comprising at least one drying chamber (40), at least one circulation fan (41), and at least one heat exchanger (42). The at least one drying chamber comprises a mixing system and mixed particulate matter, at least one inlet for the feed stream of wet particulate matter, at least one inlet for superheated steam, and at least one outlet for exhaust steam.

The number and position of the at least one inlet for the at least one feed stream (1, 2) and/or the number and position inside the drying chamber, where the at least one feed stream enters and distributes onto the mixed particulate matter may depend on the characteristics of the wet particulate matter, the characteristics of the mixed particulate matter, the design of the at least one drying chamber, and the tendency of the mixed particulate matter to generate fines within the drying chamber. Depending on the characteristics of the wet particulate matter and the mixed particulate matter, the design of the at least one drying chamber, and the tendency of the mixed particulate matter to generate fines within the at least one drying chamber, the at least one drying chamber may also contain more than one inlet for the feed stream, e.g., two, three, four or five inlets for the at least one feed stream.

The number and position of the at least one inlet for the superheated steam (6) and/or the at least one outlet for exhaust steam (3) may depend on the characteristics of the mixed particulate matter, the design of the at least one drying chamber, and the tendency of the mixed particulate matter to generate fines within the at least one drying chamber.

According to one embodiment of the present invention, the at least one drying chamber comprises at least one outlet for dried particulate matter. At least for continuous vacuum operation a valve arrangement may be present for the at least one product stream (10).

Figure 3:
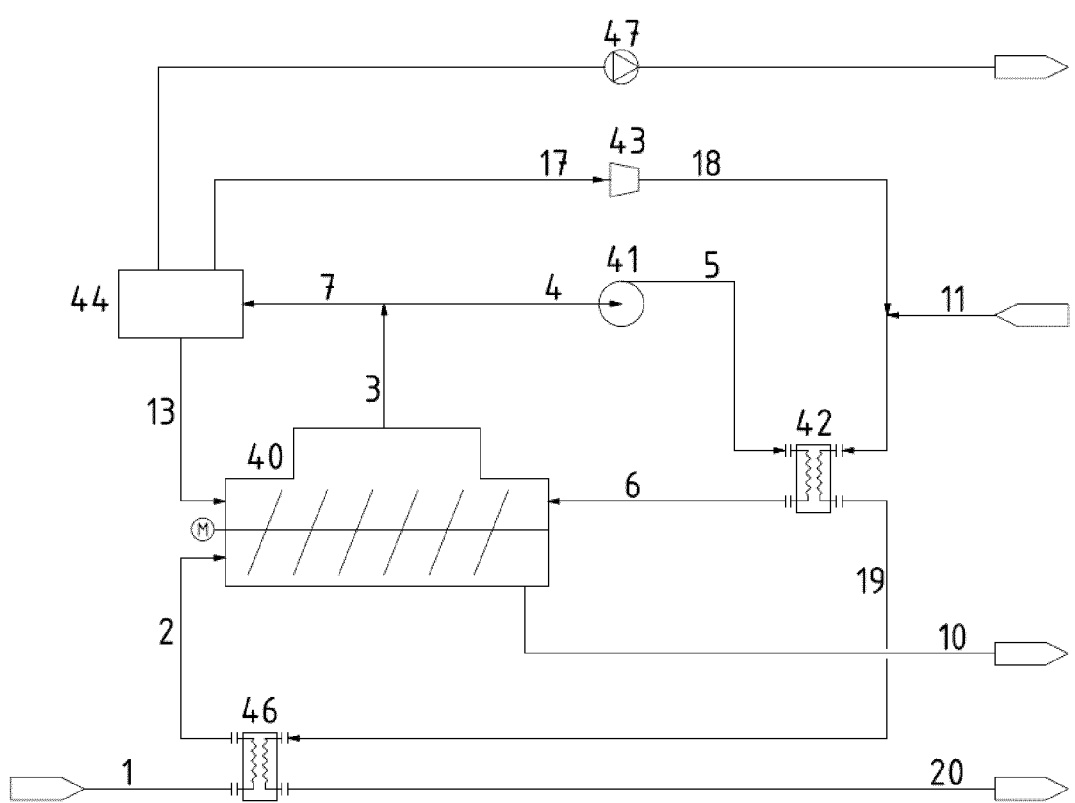
FIG. 3 is a schematic flow diagram illustrating another exemplary embodiment of the present invention.

According to one embodiment of the present invention, the at least one drying chamber comprises at least one additional inlet for a recycle stream, e.g., such as shown in FIG. 3 (see FIG. 3, reference 13).

According to one embodiment of the present invention, the mixing system is selected from a one, two- or more shafts mixer, or a one-, two- or more shafts combined mixer and mechanical fluidized bed establisher. The mixing design aims to achieve homogenous mixed particulate matter composition and also to control a uniform size distribution of the particles, agglomerates or granulates. According to a preferred embodiment, the mixing system is a two shafts combined mixer and mechanical fluidized bed establisher.

The at least one feed stream (1) of wet particulate matter is fed, either continuously or discontinuously, into the mixed particulate matter in the at least one drying chamber (40) via the at least one inlet for the feed stream, and superheated steam (6) is fed into the drying chamber (40) via the at least one inlet for superheated steam.

The skilled person will be aware that the pressure of the at least one feed stream must be sufficiently higher than pressure inside the drying chamber. The pressure of the at least one feed stream may also depend on distribution means inside the at least one drying chamber for the at least one feed stream.

According to an exemplary embodiment of the present invention, the at least one feed stream comprises one feed stream comprising wet particulate matter in form of a slurry and one feed stream comprising wet particulate matter in form of a moist cake.

The mixed particulate matter is directly contacted with superheated steam within the at least one drying chamber (40) to dry the mixed particulate matter and said steam is exhausted via the at least one outlet for exhaust steam without separating from the exhaust steam (3) any carried particulate matter.

The at least one drying chamber with the mixing system operates under the direct drying principle, i.e. the superheated steam is in direct contact with the mixed particulate matter. The superheated steam supplies heat for evaporation of the moisture of the mixed particulate matter and carries away the evaporated moisture. The superheated steam enters through the at least one inlet for superheated steam, contacts the mixed particulate matter, and exits the at least one drying chamber through the at least one outlet for exhaust steam. Without being bound to any theory, it is believed that a drying chamber with a mixing system provides a very efficient mass and heat transfer due to the intimate contact and mixing of the superheated steam and the mixed particulate matter.

The exhaust steam travels along the recirculation circuit comprising the at least one drying chamber (40), the at least one circulation fan (41), and the at least one heat exchanger (42). According to one embodiment of the present invention, the at least one drying chamber and/or the remaining recirculation circuit excluding the at least one drying chamber comprises at least one outlet for dried particulate matter.

The exhaust steam (3, 4, 5) is fed into the at least one heat exchanger (42), wherein the exhaust steam passes the at least one circulation fan (41) before or after the at least one heat exchanger (42). The at least one circulation fan maintains the flow rate of the steam in the recirculation circuit by overcoming the pressure drop in the recirculation circuit.

In the at least one heat exchanger, the exhaust steam (5) is reheated to provide superheated steam (6). The obtained superheated steam is fed back into the drying chamber (40) via the at least one inlet for superheated steam.

The at least one heat exchanger (42) may comprise at least one inlet for exhaust steam and at least one outlet for superheated steam.

According to one embodiment of the present invention, the at least one heat exchanger (42) is a shell and tube heat exchanger. Without being bound to any theory, it is believed that such a heat exchanger design is advantageous since, for example, it is robust to carried particulate matter and could be designed for sufficient low pressure drop. Other heat exchangers that may be used are plate heat exchanger of various types.

According to one embodiment of the present invention, the exhaust steam (3, 4) passes the at least one circulation fan (41) before the at least one heat exchanger (42), e.g., such as shown in FIG. 1.

Figure 2:
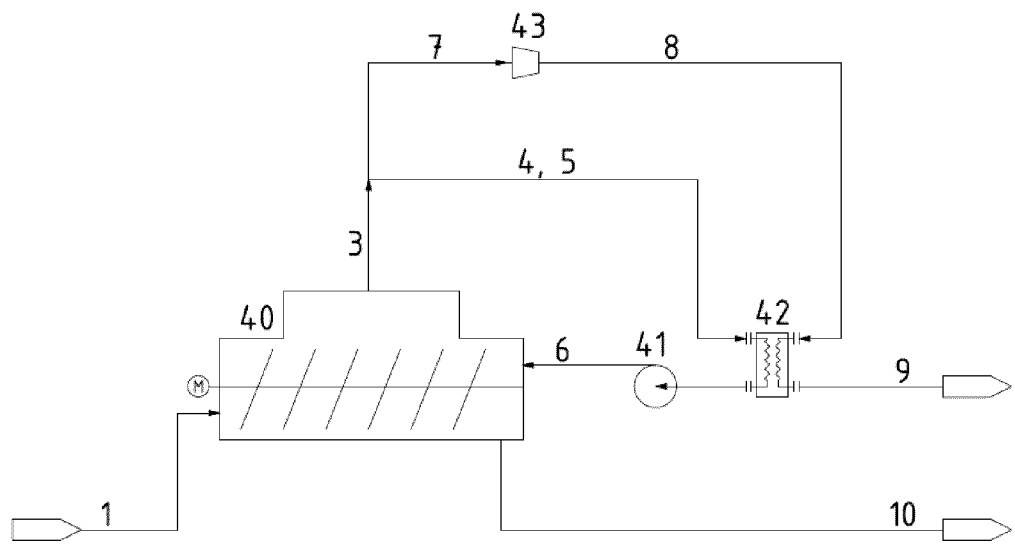
FIG. 2 is a schematic flow diagram illustrating another exemplary embodiment of the present invention.

According to another embodiment of the present invention, the exhaust steam passes the at least one circulation fan (41) after the at least one heat exchanger (42), e.g., such as shown in FIG. 2. Such a design may lead to a reduced total moisture content of the carried particulate matter fed to the circulation fan (41), as the carried particulate matter would be further dried through the at least one heat exchanger (42). Another advantage, may be that the temperatures of the exhaust steam entering the at least one heat exchanger (42) and the superheated steam leaving the at least one heat exchanger (42) are slightly lower, and hence the compressed steam (8, 18) saturated temperature would decrease and energy consumption for mechanical vapour recompression system would be correspondingly slightly lower, as the electrical energy input to the at least one circulation fan (41), and hence the corresponding temperature increase of the superheated steam, in this case would be done after the at least one heat exchanger (42). In case a separation by gravity is used before the at least one circulation fan (41), as described below as an optional embodiment, another advantage, may be that the amount of carried particulate matter fed into the at least one circulation fan (41) would be reduced.

According to another exemplary embodiment of the present invention, the exhaust steam (3, 4) is split and passes at least two parallel circulation fans before or after the at least one heat exchanger (42).

The inventive method for drying wet particulate matter comprises further the step of splitting an excess steam (7) from at least one position within the recirculation circuit.

The excess steam may be split from any position within the recirculation circuit, e.g., from the exhaust steam (3, 4, 5), the superheated steam (6), the at least one drying chamber (40), the at least one circulation fan (41) and/or the at least one heat exchanger (42).

According to one embodiment of the present invention, the excess steam (7) is split from at least one position within the recirculation circuit, wherein the amount of carried particulate matter is found to be lowest. An exemplary embodiment is shown in FIG. 1, wherein the excess steam (7) is split from the exhaust steam (3) after leaving the drying chamber (40) and before leaving the circulation fan (41), while the remaining exhaust steam travels along the recirculation circuit and is reheated to provide superheated steam.

The excess steam (7) is fed into at least one mechanical compressor (43), wherein the excess steam is compressed to raise the pressure, and hence the saturated temperature of the excess steam. When a mechanical compressor is used directly in process steam or vapour as described above and the compressed steam is used as energy source for the same thermal process, the term "mechanical vapour recompression (MVR)" is commonly used.

According to one embodiment of the present invention, the at least one mechanical compressor is, for instance, a centrifugal compressor, a high pressure centrifugal fan, or a positive displacement roots blower. Preferably, the at least one mechanical compressor is a high pressure centrifugal fan, which has the advantage that it accepts a certain amount of carried particulate matter, and thus, renders the presence of a fines/steam separator unnecessary. The choice of the mechanical compressor may also depend upon the evaporated water capacity and/or the total temperature difference $\Delta T_E$ defined below. The different mechanical compressor types have also different compression efficiencies.

Alternatively, the energy system may be based on thermal recompression of the excess steam by means of a steam ejector, for which high pressure steam is used as driving force for the ejector. However, such an alternative energy system may provide a lesser degree of energy recovery.

A major part of the energy recovery in the inventive method is achieved by mechanical recompression of the excess steam. The energy used for the at least one mechanical compressor can be electric or thermal energy. If thermal energy is used, waste energy from the at least one mechanical compressor may be utilized, at least partially, as energy supply for the inventive process.

After leaving the at least one mechanical compressor, the compressed excess steam (8) is used as a source of heat in the at least one heat exchanger (42), and is discharged as a liquid condensate (9). The condensate (9) may either be directly discharged or fully or partly used for heating, for example, for heating the feed stream in a pre-heater as shown in FIG. 3 (see FIG. 3, reference 46), and/or fully or partly internally reused before being discharged.

The at least one heat exchanger (42) may comprise at least one inlet for compressed excess steam (8) and at least one outlet for liquid condensate (9).

The dried particulate matter is discharged, either continuously or discontinuously, as at least one product stream via at least one outlet to obtain the dried particulate matter.

According to one embodiment of the present invention, the at least one drying chamber (40) comprises at least one outlet for dried particulate matter and the at least one product stream (10) is discharged via the at least one outlet for dried particulate matter from the drying chamber, e.g., such as shown in FIG. 1. According to another embodiment of the present invention, the remaining recirculation circuit excluding the at least one drying chamber comprises at least one outlet for dried particulate matter and the at least one product stream is discharged via the at least one outlet for dried particulate matter from the recirculation circuit excluding the at least one drying chamber. According to still another embodiment of the present invention, the at least one drying chamber (40) comprises at least one outlet for dried particulate matter and the remaining recirculation circuit excluding the at least one drying chamber comprises at least one outlet for dried particulate matter and the at least one product stream is discharged via the at least one outlet for dried particulate matter from the drying chamber and via the at least one outlet for dried particulate matter from the recirculation circuit excluding the at least one drying chamber.

According to one embodiment of the present invention, the obtained dried particulate matter contains less than 15 wt.-% total moisture, preferably less than 5 wt.-%, more preferably less than 2 wt.-%, and most preferably less than 1 wt.-%, based on the total weight of the dried particulate matter.

According to an exemplary embodiment of the present invention, the at least one drying chamber (40) comprises a first outlet for dried particulate matter and the remaining recirculation circuit excluding the at least one drying chamber comprises a second outlet for dried particulate matter and a first product stream is discharged via the first outlet and second product stream is discharged via the second outlet, wherein the moisture content of dried particulate matter in the first product stream is greater than the moisture content of the dried particulate matter in the second product stream.

The method according to the present invention may be used for manufacturing calcium carbonate having a solid content of more than 95 wt.-%, based on the total weight of the calcium carbonate. According to a preferred embodiment, the calcium carbonate is manufactured without the presence of a classifier.

According to one embodiment of the present invention, the obtained dried particulate matter is calcium carbonate having a solid content of more than 95 wt.-%, preferably more than 98 wt.-%, and most preferably more than 99 wt.-%, based on the total weight of the calcium carbonate.

According to another embodiment of the present invention, the white mineral obtainable by the method according to the present invention is calcium carbonate having a total moisture of less than 5 wt.-%, preferably less than 2 wt.-%, and most preferably less than 1 wt.-%, based on the total weight of the calcium carbonate.

According to one embodiment of the present invention, the average retention time of the dried particulate matter inside the recirculation circuit is at least 10 minutes, at least 30 minutes, or at least 60 minutes.

The method of the present invention may be carried out at a drying chamber pressure of 0 to 5 bar. According to a preferred embodiment, the pressure in the drying chamber is from 0.1 to 1.5 bar, and more preferably from 0.1 to 0.95 bar or from 1.05 to 1.2 bar. A vacuum pump may be used in order to carry out the inventive method under vacuum.

The method of the present invention, wherein the superheated steam is superheated water steam and the pressure in the at least one drying chamber is from 0.8 to 1.2 bar, may be carried out with a pressure drop through the recirculation circuit of from 500 to 3000 Pa, preferably from 1000 to 2000 Pa.

According to one exemplary embodiment of the present invention, the flow rate of the superheated water steam (6) having a pressure of 1.05 bar fed into the at least one drying chamber is from 6 to 100 m$^3$/s, preferably 12 to 50 m$^3$/s, and more preferably 18 to 35 m$^3$/s, and most preferably 22 to 35 m$^3$/s, and the excess steam flow rate is 1000 kg/hour.

Surprisingly, it has been found that by utilizing at least one drying chamber with a mixing system, one maintain large and stable mixed particulate matter heat- and mass transfer surface area and rather low concentration of carried particulate matter in the exhaust steam leaving the at least one drying chamber, even with high steam flow rates in the recirculation circuit. Furthermore, it has been found that the inventive method does not require a fines/steam separator in the recirculation circuit since the carried particulate matter in the exhaust steam is handled efficiently in the inventive drying method. Rather, the presence of carried particulate matter may even increase the heat transfer efficiency of the at least one heat exchanger in the recirculation circuit.

The absence of a fines/steam separator in the recirculation circuit avoids a significant pressure drop, and thus, the system can be operated with a lower differential pressure within the recirculation circuit, which reduces the energy consumption of the drying process significantly. If necessary, depending on the actual wet particulate matter characteristics, for handling the carried particulate matter that is present within the recirculation circuit excluding the at least one drying chamber one can apply a mainly vertical arrangement of the recirculation circuit, maintain sufficient high velocity, introduce specific means in the recirculation circuit or discharge the carried particulate matter by gravity from the recirculation circuit excluding the at least one drying chamber, or combine two or more of these means.

Furthermore, it has been found that there is a specific temperature difference $\Delta T_R$ between the temperature of the superheated steam that is fed into the at least one drying chamber via the at least one inlet for the superheated steam and the temperature of the exhaust steam leaving the at least one drying chamber that is advantageous in combination with the at least one mechanical compressor used in the inventive method.

According to one embodiment of the present invention, the temperature of the superheated steam (6) that is fed into the at least one drying chamber and the temperature of the exhaust steam (3) leaving the at least one drying chamber differs by a temperature difference $\Delta T_R$, wherein $\Delta T_R$ is from 5 to 100° C., preferably 10 to 50° C., more preferably 15 to 30° C., even more preferably 15 to 25° C., and most preferably about 22° C.

According to an exemplary embodiment of the present invention, the superheated steam is superheated water steam and the temperature of the superheated steam (6) is from 105 to 220° C., preferably from 110 to 170° C., more preferably from 115° C. to 150° C., and most preferably 115 to 135° C. at a pressure of 1.05 bar, and/or the temperature of the exhaust steam (3) is from 101 to 120° C., preferably from 102 to 115° C., even more preferably 102 to 110° C., and most preferably about 102 to 105° C., at a pressure of 1.05 bar.

According to one embodiment of the present invention, the saturated temperature of the compressed excess steam (8) and the saturated temperature of the excess steam (7) differ by a temperature difference $\Delta T_E$, wherein $\Delta T_E$ is from 6 to 130° C., preferably from 11 to 80° C., more preferably from 15 to 60° C., and most preferably 20 to 45° C.

According to a preferred embodiment of the present invention, the superheated steam is superheated water steam and $\Delta T_R$ is from 5 to 100° C., preferably from 10 to 50° C., more preferably from 15 to 30° C., and/or $\Delta T_E$ is from 6 to 130° C., preferably from 11 to 80° C., more preferably from 15 to 60° C., and most preferably from 20 to 45° C.

According to another preferred embodiment of the present invention, the superheated steam is superheated water steam and $\Delta T_R$ is from 15 to 30° C. and $\Delta T_E$ is from 20 to 45° C.

According to one embodiment of the present invention, the difference between $\Delta T_E$ and $\Delta T_R$ is from 1 to 30° C., preferably from 4 to 20° C., more preferably from 6 to 15° C., and most preferably 6 to 10° C.

In addition to the features described above, the method of the present invention may comprise further, optional features, which will be described with the help of FIG. 3, illustrating another embodiment of the drying method of the present invention.

According to an optional embodiment of the present invention, the excess steam (7) passes at least one separator (44) to remove any carried particulate matter from the excess steam before it is fed as purified and/or reboiled excess steam (17) into the at least one mechanical compressor (43).

The at least one separator (44) may be a dry separator and/or a wet separator. Examples for suitable dry separators are cyclones or filters. Examples for suitable wet separators are scrubbers or reboilers.

The at least one separator (44) may be connected to a vent line or a vacuum pump (47) in order to purge air or inert gases. The condensate stream (9, 19) may also be connected to a vent line or a vacuum line (not illustrated in FIG. 3).

According to an optional embodiment of the present invention, the removed carried particulate matter in the at least one separator (44) is fed as a recycle stream (13) into the at least one drying chamber (40). The recycle stream (13) may be fed via at least one inlet for the recycle stream into the at least one drying chamber. The recycle stream can also be directed to the at least one feed stream (1, 2), however, not shown in FIG. 3.

If the height difference between the at least one separator and the at least one drying chamber or the at least one feed stream is sufficient, this recycle stream flow can be maintained with no further pressurizing device. If a wet separator is used, the recycle stream (13) is in liquid state containing the diluted carried particulate matter, and said stream (13) may be concentrated before being fed into the at least one drying chamber (40) via the at least one inlet for the recycle stream or into the at least one feed stream (1, 2). Wet separators with an integrated potential functionality of concentrating the diluted carried particulate matter are, for example, scrubbers or reboilers.

This optional embodiment may have the advantage that the carried particulate matter in the excess steam can be recycled by means of a fully integrated system with low or negligible additional energy consumption, the absolute value depending on the ratio of carried particulate matter of the recycle stream (13) and the excess steam (7), and, if a wet separator is applied, also the boiling point elevation of the recycle stream (13). In other words, this optional embodiment may permit a twofold reduction of costs involved in the drying of wet particulate matter; there is no loss of carried particulate matter since it is recycled and there may only be low or negligible extra energy required for the recycling.

According to an optional embodiment of the present invention, at least a part of the condensate (9, 19) is fed into the at least one separator (44) for maintaining the solvent mass balance within the at least one separator and the overall drying system.

According to another optional embodiment of the present invention, the removed carried particulate matter in the at least one separator (44) is discharged as discharge stream from said separator. In case a dry separator is used and the carried particulate matter is sufficiently dry, the removed carried particulate matter may be discharged as a dried particulate matter contributing to the total system dried particulate matter mass balance. Alternatively, in case of wet separator, the diluted carried particulate matter may be discharged as discharge stream in form of a liquid or a slurry, wherein, depending on the ratio of carried particulate matter of the discharge stream and the excess steam (7), at least a part of the condensate (9, 19) is fed into the at least one separator (44) for maintaining the mass balance within the at least one separator and the overall drying system.

According to one optional embodiment of the present invention, the at least one feed stream (1) is preheated before it is fed into the at least one drying chamber (40). Preferably, the at least one feed steam (1) is preheated by at least one heat exchanger (46) designed to handle the wet particulate matter, wherein the liquid condensate (9, 19) and/or the discharge stream from the at least one separator (44) is used as a source of heat. The at least one heat exchanger (46) may comprise at least one inlet for feed stream (1), at least one outlet for preheated feed stream (2), at least one inlet for hot condensate (9, 19) or hot discharge stream from the separator (44), and at least one outlet for sub-cooled condensate (20) or sub-cooled discharge stream from the at least one separator (44).

According to one optional embodiment of the present invention, the carried particulate matter in the recirculation circuit excluding the at least one drying chamber could be partly separated by simply gravity means at any position in the recirculation circuit excluding the at least one drying chamber, preferably at a position after the at least one heat exchanger (42) and before the at least one drying chamber (40). In case the carried particulate matter is sufficiently dry, this carried particulate matter discharge would contribute to the total system dried particulate matter mass balance. Optionally said carried particulate matter discharge may be recycled back into the at least one drying chamber via at least one inlet or into the at least one feed stream.

The inventive drying method may be carried out in a well insulated drying system or in a drying system that is externally heated via double wall shell to eliminate or minimize internal condensation inside the drying system, e.g., in the areas comprising particulate matter.

According to another optional embodiment, the at least one drying chamber and/or steam pipelines used to carry out the inventive method comprise a double wall shell and a part of the compressed steam (8, 18) is used as a source of heat for internal re-heating of the drying medium or superheated steam in the at least one drying chamber (40) and/or connected pipelines used to carry out the inventive method. This may further reduce the overall energy consumption due to reduced superheated steam (6) flow rate and at the same time may result in a lower risk of condensation inside the at least one drying chamber and the steam pipelines.

According to still another optional embodiment, the liquid condensate (9, 19) is used to cool the compressed steam (8, 18) before it enters the at least one heat exchanger (42). The injection of liquid condensate for this purpose could be either before or after the at least one mechanical compressor (43).

According to still another optional embodiment of the present invention, an external energy input (11) may be employed to start the inventive method. A suitable external energy input may be steam from a boiler or hot water. However, an external energy input is not mandatory for start up purpose. For example, if a hot feed stream, a running at least one circulation fan, and the at least one mechanical compressor are driven, the drying system can be heated up by its own. At steady state operation an external energy input may be not required in case of an excess of energy in the total system, and is hence shut off via an on/off valve. When external energy is required during operation due to total energy balance and/or the feed characteristics, it could either be supplied directly into the compressed steam or indirectly via the at least one separate heat exchanger in the recirculation circuit. If excess of energy in the total system is present, this may be removed from a steam line between the at least one drying chamber (40) and the at least one heat exchanger (42) by an externally cooled condenser to maintain total energy balance.

According to still another, optional embodiment, the method according to the present invention may comprise at least two drying chambers in series, parallel or combination of series and parallel. In case serially connected chambers are used, the method of the present invention may be carried out without reheating between drying chambers or with reheating between at least two of the chambers, without superheated steam bypass of the drying chambers or with superheated steam bypass of at least one drying chamber, with similar moisture content of the mixed particulate matter or with different moisture content of the mixed particulate matter in at least two drying chambers, with similar drying chamber temperatures or with different drying chamber superheated steam inlet/outlet temperatures in at least two drying chambers, and with at least one MVR system. Some potential advantages of this optional embodiment may be an overall further optimized drying method, a drying method optimized for each type of wet particulate matter to be dried, improved energy efficiency, improved heat- and mass transfer in drying chambers and/or lower amount of carried particulate matter in the main recirculation circuit excluding the at least one drying chamber.

The white mineral obtainable by a method according to the present invention may be used in paper applications, paints, sealants, adhesives, concrete, agriculture, cosmetics, food, feed, pharmaceuticals, water treatment and/or plastics.

EXAMPLES

Example 1

Example 1 is a comparison between the energy consumption of the inventive drying process and a drying process using a conventional direct superheated steam mixing dryer without energy recovery of the excess steam latent heat.

The conventional dryer included a fines/steam cyclone type separator in the recirculation circuit which leads to a higher estimated pressure drop in the steam recirculation circuit. The total energy consumption was calculated in accordance to the overall system energy balance. The electrical energy consumption was based on standard calculation models of energy consumption for the circulation fan based on differential pressure, volume flow rate and total fan efficiency and using the commonly assumed values of electrical energy consumption of mixing device and pumps. The inventive drying process setup was based on the process design shown in FIG. 1.

In the results, the consequence of a fines/steam separator in the recirculation circuit of the inventive drying process is discussed. The numbers in brackets refer to the actual equipment, steam or stream position in FIG. 1. The effect consumption (kW) must be seen in relation to the evaporated water capacity specified in the common design data.

Common Design Data
Wet particulate matter: $CaCO_3$ in water
Feed concentration (1): 50 wt.-% solids content
Product concentration (10): 99 wt.-% solids content
Feed capacity: 2000 kg/h
Evaporated water capacity (7, 8, 9): 1000 kg/h
Drying chamber pressure: 1.05 bar
Retention time: more than 30 minutes
Effect consumption mixer and pumps: 30 kW
Circulation fan efficiency (41): 0.65
Mechanical compressor efficiency (43): 0.60
Conventional Direct Superheated Steam Drying Process
Temperature inlet to drying chamber: 164° C.
Temperature outlet of drying chamber: 102° C.
Pressure drop in recirculation circuit: 6000 Pa
Total thermal effect consumption: 550 kW
Total electric effect consumption circulation fan: 70 kW
Total effect consumption: 650 kW
Inventive Process
Temperature inlet to drying chamber (6): 124° C.
Temperature outlet of drying chamber (3): 102° C.
$\Delta T_R$ or temperature difference of superheated steam entering (6) and the exhaust steam (3) leaving the drying chamber: 22° C.
$\Delta T_E$ or temperature increase MVR system (43): $\Delta T_R+6°$ C.=28° C.
Pressure drop in recirculation circuit (3-4-41-5-42-6-40): 1500 Pa
Superheated steam volume flow rate (6): 24 m³/s
Total thermal effect consumption: 0 kW
Electrical effect consumption circulation fan: 50 kW
Electrical effect consumption MVR system: 75 kW
Total effect consumption: 155 kW
Result The inventive process according to this example showed an approximately 76% lower total energy consumption than the conventional drying process. The presence of a fines/steam separating device in the recirculation circuit (e.g. a cyclone), with assumed additional pressure drop of 4500 Pa and otherwise the same design data, led to an approximately 150 kW increased electrical effect consumption for the circulation fan, and hence, the total energy consumption was 305 kW, i.e. two times higher than for the inventive process.

Example 2

Figure 4:
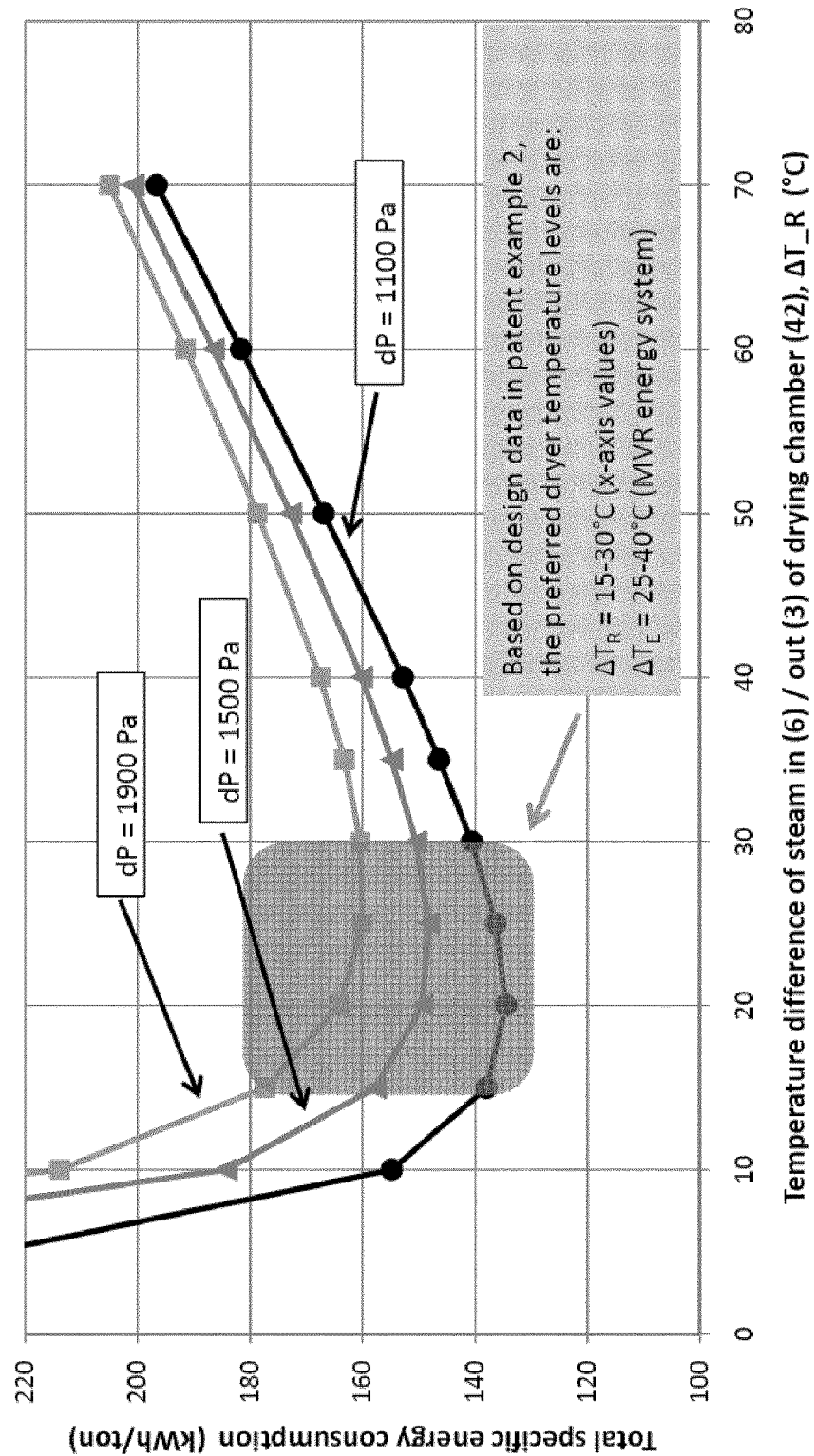
FIG. 4 is a graph showing the total specific energy consumption versus the temperature difference of the temperature of the superheated steam fed into the drying chamber and the temperature of the exhaust steam leaving the drying chamber for an exemplary embodiment of the present invention.

FIG. 4 shows a calculation of the total specific energy consumption (i.e. kWh per ton evaporated water) versus temperature difference of the superheated steam fed into drying chamber and the exhaust steam leaving the drying chamber based on the design data specified below for the inventive process illustrated in FIG. 3. In this example also the sensitivity of the recirculation circuit pressure drop versus the optimum temperature levels for the process is shown. The numbers in brackets refer to the actual equipment, steam or stream position in FIG. 3.

Design Data
Wet particulate matter: $CaCO_3$ in water
Feed concentration (1): 50 wt.-% solids content
Product concentration (10): 99 wt.-% solids content
Drying chamber pressure (40): 1.05 bar
Retention time: more than 30 minutes
Carried particulate matter in excess steam (7): 1 wt.-%
$\Delta T_E$ or temperature increase MVR system: $\Delta T_R+10°$ C.
Pressure drop in recirculation circuit (3-4-41-5-42-6-40): 1100 or 1500 or 1900 Pa
Circulation fan efficiency (41): 0.75
Mechanical compressor efficiency (43): 0.78
Specific energy consumption mixer and pumps: 30 kWh/ton evaporated water FIG. 4 illustrates that the optimum energy consumption versus $\Delta T_R$ occurred at approximately $\Delta T_R=15-30°$ C. The energy consumption of the circulation fan was reduced when $\Delta T_R$ was increased due to the reduced flow rate of the superheated steam. The opposite occurred for the mechanical compressor energy consumption due to the need of a higher $\Delta T_E$, to compensate for the higher $\Delta T_R$, or more specifically the higher superheated steam temperature outlet from the heat exchanger (42). FIG. 4 also illustrates the effect of a reduced (1100 Pa) or increased (1900 Pa) pressure drop (dP) in the recirculation circuit, and shows that the optimum temperature level is still rather low and rather within the same range.

Example 3

Figure 5:
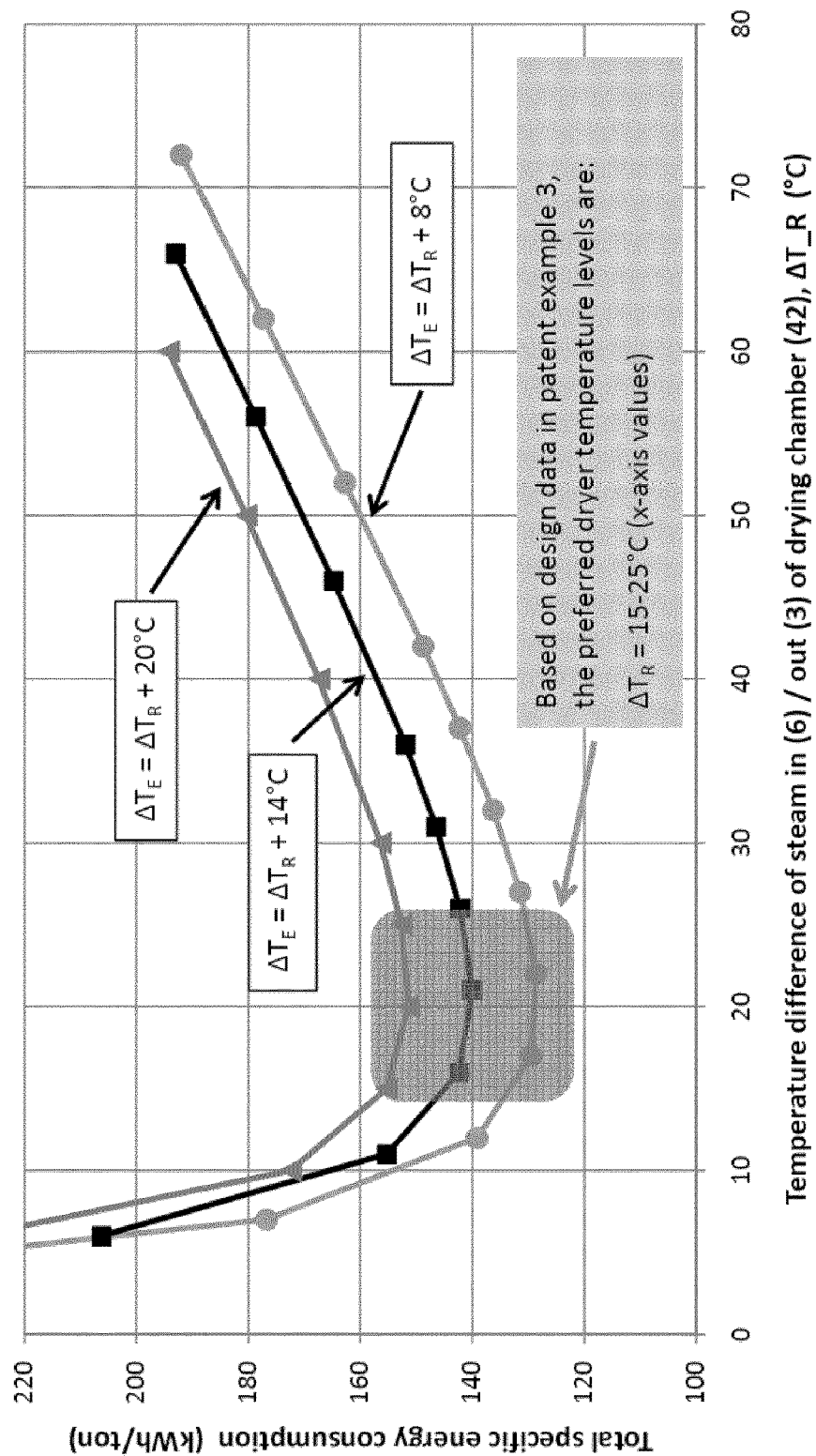
FIG. 5 is a graph showing the total specific energy consumption versus the temperature difference of the temperature of the superheated steam fed into the drying chamber and the temperature of the exhaust steam leaving the drying chamber for another exemplary embodiment of the present invention.

FIG. 5 shows the sensitivity of increased temperature difference between $\Delta T_E$ and $\Delta T_R$, which is relevant, for instance, when the boiling point elevation is increasing. In this example, the wet particulate matter composition was only defined indirectly by the mixed particulate matter boiling point elevation characteristics specified below. For three different cases, calculations of the total specific energy consumption (i.e. kWh per ton evaporated water) versus temperature difference of the superheated steam fed into drying chamber and the exhaust steam leaving the drying chamber are shown based on the design data specified below for the inventive process illustrated in FIG. 1. The numbers in brackets refer to the actual equipment, steam or stream position in FIG. 1.

Design Data Used
Wet particulate matter: in relation to the mixed particulate matter definition
Mixed particulate matter boiling point elevation: 0 or 6 or 12° C.

Feed concentration (1): 50 wt.-% solids content
Product concentration (10): 99 wt.-% solids content
Drying chamber pressure (40): 1.05 bar
Retention time: more than 30 minutes
$\Delta T_E$ or temperature increase MVR system (43): $\Delta T_R+8$ or $\Delta T_R+14$ or $\Delta T_R+20°$ C.
Pressure drop in recirculation circuit (3-4-41-5-42-6-40): 1100 Pa
Circulation fan efficiency (41): 0.75
Mechanical compressor efficiency (43): 0.78
Specific energy consumption mixer and pumps: 30 kWh/ton evaporated water The results of the calculations are illustrated in FIG. 5, which shows that the optimum $\Delta T_R$ temperature level is rather low and within the same range for the three different cases, wherein the optimum $\Delta T_R$ range is from 15 to 25° C. Consequently, when drying a wet or mixed particulate matter with higher boiling point elevation one may keep the same $\Delta T_R$, while the $\Delta T_E$ and hence the mechanical compressor energy consumption may be increased to compensate for the higher boiling point elevation.

Example 4

This example is based on the inventive process illustrated in FIG. 3 and shows the additional energy consumption for carried particulate matter in excess steam recycling by use of a wet type separator. The inventive process without recycling of the carried particulate matter in the excess steam was compared with the inventive process with recycling. Two examples for recycling are used, with 0.5 wt.-% and 2.0 wt.-% carried particulate matter in the excess steam, respectively. The numbers in brackets refer to the actual equipment, steam or stream position in FIG. 3.
Design Data Used:
Wet particulate matter: $CaCO_3$ in water
Feed concentration (1): 50 wt.-% solids content
Product concentration (10): 99 wt.-% solids content
Drying chamber pressure (40): 0.91 bar
Retention time: more than 30 minutes
Carried particulate matter in excess steam (7): 0.5 wt.-% and 2.0 wt.-%
Concentration of carried particulate matter in recycle stream (13): 50 wt.-%
$\Delta T_R$ or temperature difference of superheated steam entering (6) and the exhaust steam (3) leaving the drying chamber: 22° C.
$\Delta T_E$ or temperature increase MVR system, without recycling: $\Delta T_R+12°$ C.
$\Delta T_E$ or temperature increase MVR system, with recycling: $\Delta T_R+13°$ C.
Pressure drop in recirculation circuit (3-4-41-5-42-6-40): 1400 Pa
Circulation fan efficiency (41): 0.70
Mechanical compressor efficiency (43): 0.75
Specific energy consumption mixer and pumps: 30 kWh/ton evaporated water
Results:
Specific energy consumption without recycling=154 kWh/ton
Specific energy consumption with recycling, 0.5 wt.-% carried particulate matter in excess steam=158 kWh/ton
Specific energy consumption with recycling, 2.0 wt.-% carried particulate matter in excess steam=160 kWh/ton
The additional energy consumption with recycling was hence 2-4%.

The invention claimed is:

1. A method for drying wet particulate matter, wherein the dried particulate matter is a white mineral having a brightness Ry of at least 65% measured according to DIN 53163, the method comprising the steps of:
   a) providing at least one feed stream of wet particulate matter;
   b) providing a recirculation circuit comprising at least one drying chamber, at least one circulation fan, and at least one heat exchanger, wherein the at least one drying chamber comprises a mixing system and mixed particulate matter, at least one inlet for the feed stream of wet particulate matter, at least one inlet for superheated steam, and at least one outlet for exhaust steam, wherein the recirculation circuit includes no fines/steam separator between the at least one outlet of the at least one drying chamber for exhaust steam, the at least one inlet of the at least one drying chamber for the feed stream of wet particulate matter, and the at least one inlet of the at least one drying chamber for superheated steam that is configured to separate particulate matter from the exhaust steam traveling along the recirculation circuit;
   c) feeding, either continuously or discontinuously, the at least one feed stream of wet particulate matter into the mixed particulate matter in the at least one drying chamber via the at least one inlet for the feed stream;
   d) feeding superheated steam into the at least one drying chamber via the at least one inlet for superheated steam;
   e) directly contacting the mixed particulate matter with superheated steam within the at least one drying chamber to dry the mixed particulate matter and exhausting said steam via the at least one outlet for exhaust steam without separating from the exhaust steam any carried particulate matter;
   f) feeding the exhaust steam carrying particulate matter from the step (e), without separating from the exhaust steam any carried particulate matter, into the at least one heat exchanger, in which the exhaust steam carrying particulate matter is reheated to provide superheated steam, wherein the exhaust steam carrying particulate matter passes the at least one circulation fan before or after the at least one heat exchanger, and feeding said superheated steam back into the at least one drying chamber via the at least one inlet for superheated steam;
   g) splitting an excess steam from at least one position within the recirculation circuit;
   h) feeding the excess steam into at least one mechanical compressor, wherein the excess steam is compressed to raise its saturated temperature, using said compressed excess steam as a source of heat in the at least one heat exchanger, and discharging the excess steam as a liquid condensate; and
   i) discharging, either continuously or discontinuously, the dried particulate matter as at least one product stream via at least one outlet to obtain the dried particulate matter.

2. The method according to claim 1, wherein the at least one drying chamber comprises at least one outlet for dried particulate matter and the at least one product stream is discharged via the at least one outlet for dried particulate matter from the at least one drying chamber and/or the remaining recirculation circuit excluding the at least one drying chamber comprises at least one outlet for dried particulate matter and the at least one product stream is discharged via the at least one outlet for dried particulate matter from the recirculation circuit excluding the at least one drying chamber.

3. The method according to claim 1, wherein the mixing system within the drying chamber is a one, two- or more shafts mixer, a one, two- or more shafts combined mixer and mechanical fluidized bed establisher, or a two shafts combined mixer and mechanical fluidized bed establisher.

4. The method according to claim 1, wherein the at least one drying chamber has an internal pressure of from 0 to 5 bar.

5. The method according to claim 1, wherein the at least one drying chamber has an internal pressure of from 0.1 to 1.5 bar.

6. The method according to claim 1, wherein the at least one drying chamber has an internal pressure of from 0.1 to 0.95 bar.

7. The method according to claim 1, wherein the at least one drying chamber has an internal pressure of from 1.05 to 1.2 bar.

8. The method according to claim 1, wherein the superheated steam is superheated water steam and the pressure drop through the recirculation circuit is from 500 to 3000 Pa at a pressure in the at least one drying chamber of 0.8 to 1.2 bar.

9. The method according to claim 1, wherein the superheated steam is superheated water steam and the pressure drop through the recirculation circuit is from 1000 to 2000 Pa at a pressure in the at least one drying chamber of 0.8 to 1.2 bar.

10. The method according to claim 1, wherein the excess steam is split from at least one position within the recirculation circuit, wherein the amount of carried particulate matter is found to be lowest.

11. The method according to claim 1, wherein the excess steam is split from the exhaust steam after leaving the at least one drying chamber and before leaving the at least one circulation fan.

12. The method according to claim 1, wherein the at least one heat exchanger is a shell and tube heat exchanger.

13. The method according to claim 1, wherein the at least one mechanical compressor is a centrifugal compressor, a high pressure centrifugal fan, or a positive displacement roots blower.

14. The method according to claim 1, wherein the at least one mechanical compressor is a high pressure centrifugal fan.

15. The method according to claim 1, wherein the superheated steam's temperature and the exhaust steam's temperature leaving the at least one drying chamber differs by a temperature difference $\Delta T_R$, wherein $\Delta T_R$ is from 5 to 100° C.

16. The method according to claim 1, wherein the superheated steam's temperature and the exhaust steam's temperature leaving the at least one drying chamber differs by a temperature difference $\Delta T_R$, wherein $\Delta T_R$ is from 10 to 50° C.

17. The method according to claim 1, wherein the superheated steam's temperature and the exhaust steam's temperature leaving the at least one drying chamber differs by a temperature difference $\Delta T_R$, wherein $\Delta T_R$ is from 15 to 30° C.

18. The method according to claim 1, wherein the superheated steam's temperature and the exhaust steam's temperature leaving the at least one drying chamber differs by a temperature difference $\Delta T_R$, wherein $\Delta T_R$ is from 15 to 25° C.

19. The method according to claim 1, wherein the excess steam's saturated temperature and the compressed excess steam's saturated temperature differs by a temperature difference $\Delta T_E$, wherein $\Delta T_E$ is from 6 to 130° C.

20. The method according to claim 1, wherein the excess steam's saturated temperature and the compressed excess steam's saturated temperature differs by a temperature difference $\Delta T_E$, wherein $\Delta T_E$ is from 11 to 80° C.

21. The method according to claim 1, wherein the excess steam's saturated temperature and the compressed excess steam's saturated temperature differs by a temperature difference $\Delta T_E$, wherein $\Delta T_E$ is from 15 to 60° C.

22. The method according to claim 1, wherein the excess steam's saturated temperature and the compressed excess steam's saturated temperature differs by a temperature difference $\Delta T_E$, wherein $\Delta T_E$ is from 20 to 45° C.

23. The method according to claim 1, wherein the superheated steam's temperature and the exhaust steam's temperature leaving the at least one drying chamber differs by a temperature difference $\Delta T_R$, wherein the excess steam's saturated temperature and the compressed excess steam's saturated temperature differs by a temperature difference $\Delta T_E$, and wherein the difference between $\Delta T_E$ and $\Delta T_R$ is from 1 to 30° C.

24. The method according to claim 1, wherein the superheated steam's temperature and the exhaust steam's temperature leaving the at least one drying chamber differs by a temperature difference $\Delta T_R$, wherein the excess steam's saturated temperature and the compressed excess steam's saturated temperature differs by a temperature difference $\Delta T_E$, and wherein the difference between $\Delta T_E$ and $\Delta T_R$ is from 4 to 20° C.

25. The method according to claim 1, wherein the superheated steam's temperature and the exhaust steam's temperature leaving the at least one drying chamber differs by a temperature difference $\Delta T_R$, wherein the excess steam's saturated temperature and the compressed excess steam's saturated temperature differs by a temperature difference $\Delta T_E$, and wherein the difference between $\Delta T_E$ and $\Delta T_R$ is from 6 to 15° C.

26. The method according to claim 1, wherein the superheated steam's temperature and the exhaust steam's temperature leaving the at least one drying chamber differs by a temperature difference $\Delta T_R$, wherein the excess steam's saturated temperature and the compressed excess steam's saturated temperature differs by a temperature difference $\Delta T_E$, and wherein the difference between $\Delta T_E$ and $\Delta T_R$ is from 6 to 10° C.

27. The method according to claim 1, wherein the excess steam passes at least one separator to remove any carried particulate matter from the excess steam before it is fed as purified and/or reboiled excess steam into at least one mechanical compressor.

28. The method according to claim 27, wherein the removed carried particulate matter is fed as a recycle stream into the at least one drying chamber or into the at least one feed stream.

29. The method according to claim 1, wherein the at least one feed stream is preheated before it is fed into the at least one drying chamber.

30. The method according to claim 1, wherein the at least one feed stream is preheated before it is fed into the at least one drying chamber, and wherein the feed stream is preheated by at least one heat exchanger, wherein the liquid condensate and/or the discharge stream from the at least one separator is used as a source of heat.

31. The method according to claim 1, wherein the obtained dried particulate matter contains less than 15 wt.-% total moisture, based on a total weight of the dried particulate matter.

32. The method according to claim 1, wherein the obtained dried particulate matter contains less than 5 wt.-% total moisture, based on a total weight of the dried particulate matter.

33. The method according to claim 1, wherein the obtained dried particulate matter contains less than 2 wt.-% total moisture, based on a total weight of the dried particulate matter.

34. The method according to claim 1, wherein the obtained dried particulate matter contains less than 1 wt.-% total moisture, based on a total weight of the dried particulate matter.

35. The method according to claim 1, wherein the dried particulate matter is inside the recirculation circuit for an average retention time of at least 10 minutes.

36. The method according to claim 1, wherein the dried particulate matter is inside the recirculation circuit for an average retention time of at least 30 minutes.

37. The method according to claim 1, wherein the dried particulate matter is inside the recirculation circuit for an average retention time of at least 60 minutes.

38. The method according to claim 1, wherein the white mineral is selected from the group consisting of a calcium carbonate-based mineral, calcium hydroxide, calcium sulphate, calcium carbonate, ground calcium carbonate, a modified calcium carbonate, precipitated calcium carbonate, a calcium carbonate-containing mineral, dolomite, a tailing from calcium carbonate flotation, and any mixture thereof.

39. The method according to claim 1, wherein the white mineral is selected from the group consisting of a calcium carbonate-based mineral mixed with clay or talc or calcium hydroxide or calcium sulphate, a calcium carbonate-kaolin mixture, a mixture of calcium carbonate and bentonite, a mixture of natural calcium carbonate with aluminium hydroxide, magnesium hydroxide, mica or with synthetic or natural fibers, co-structures of minerals, a talc-calcium carbonate, a talc-titanium dioxide, and a calcium carbonate-titanium dioxide co-structure.

40. The method according to claim 1, wherein the obtained dried particulate matter is calcium carbonate having a solid content of more than 95 wt.-%, based on a total weight of the calcium carbonate.

41. The method according to claim 40, wherein the calcium carbonate is manufactured without a classifier.

42. A white mineral obtained by the method according to claim 1, wherein the white mineral has a brightness Ry of at least 65% measured according to DIN 53163.

43. The white mineral according to claim 42, wherein the white mineral is calcium carbonate having a total moisture of less than 5 wt.-%, based on a total weight of the calcium carbonate.

44. Paper, paint, a sealant, an adhesive, concrete, an agriculture product, food, feed, a pharmaceutical, a water treatment product or plastic comprising the white mineral of claim 42.

* * * * *